INVENTORS
ERIKA SCHLICHT for
GUNTER SCHLICHT, deceased
HANS LANGE
BY Toulmin & Toulmin
ATTORNEYS

Fig. 6

United States Patent Office 3,325,373
Patented June 13, 1967

3,325,373
APPARATUS AND PROCESS FOR UNDERGROUND HEAT AND RADIATION TREATMENT OF BITUMENS
Günther Schlicht, deceased, late of Hamburg-Othmarschen, Germany, by Erika Marie Elisabeth Schlicht, legal representative, Hamburg-Othmarschen, Germany, and Hans Lange, Wietze, Kreis Celle, Germany, assignors to Deutsche Erdol Aktiengesellschaft, Postfact, Germany
Filed Nov. 6, 1963, Ser. No. 321,974
Claims priority, application Germany, Nov. 8, 1962, Sch 32,308; Sept. 14, 1963, D 42,480
23 Claims. (Cl. 176—39)

This invention relates to a method and apparatus for the treatment of bitumens in underground strata in which a combined output reactor and radiation reactor is used. The thermal energy is delivered through a heat exchanger from the reactor to the medium being treated. The radiation treatment in the neighborhood of the reactor is the result of radiation from the reactor fuel, or in other limited places in the boring from fission products of the reactor fuel, or from isotopes produced in the reactor, or from other radiation sources introduced from above ground.

Variations of intensity of the radiation treatment are effected by changing the intensity and duration of the radiation. Procedures for this purpose involve the selection and arrangement of circulation paths in the reactor and changes in the rate of circulation or of the contact area or of the size of the space that is being treated.

The objects of this invention are to provide improved apparatuses and related processes for changing the intensity and duration of the radiation in the treatment of bitumens and the like.

Upon further study of the specification and claims other objects and advantages of the present invention will become apparent.

To attain the objects of this invention for the combined treatment of bitumens, especially mineral oil products, hydrocarbons or similar substances, and possibly also other kinds of substances with heat and radiation energy in borings, novel apparatuses and related processes will now be described. They comprise essentially—

(1) The mounting of the reactor in a section of the outer casing, or the mounting of the reactor together with a reflector in a separate tube whose outer diameter is less than the inner diameter of the outer casing, and which is equipped with devices for holding it in position in the outer casing. This tube is provided above the reactor with a closure similar to a packer for multiple zone treatment. With a blind boring, the outer cylindrical turn of the casing is closed at the bottom, but with a treatment or production boring it is opened to the stratum by a perforated liner.

(2) The arrangement of a treatment chamber between the reaction chamber and reflector chamber. This space can be considered as a reflector that is only slightly permeable to neutrons.

(3) The use of the total borehole space from the bottom of the borehole to the borehole closure as a treatment space for the application of heat and radiation energy.

(4) The use of descending and ascending conduits as heat exchangers of the reactors and as carriers of radiation energy. These conduits extend in the casing throughout the greater length of the boring, where the outer tubing (the casing) can serve as an ascending conduit, which then contains a suitable insulation against heat losses.

(5) The connection of the descending and ascending conduits with each other in the upper portion of the boring to form a closed circuit for circulation by thermosyphoning.

(6) The further connection between the descending and ascending conduits above the first connection, to form a larger circulation path, with an interposed pump and an injector in the descending conduit for strengthening the first circulation circuit.

(7) The arrangement of wash pipes on the outer tubing in borings of large diameter (up to 400 cm.) for safe cementing and for the introduction of thixotropic liquids as reflection media in an enlarged portion of the boring in the region of the reactor.

With these contrivances it is possible to modify in different ways the action of the heat and the radiation energy of a production reactor by changing its operating conditions in various ways, and also to treat several substances in two separate systems simultaneously under different conditions. In one of these systems, which will be called the primary system, the medium to be treated flows through the reactor reaction chamber as a moderator or cooling medium. In the other system, namely the secondary system, the medium to be treated is conducted around the center of the reactor and can also flow through the reflector and/or through a treatment space between the reactor reaction chamber and the reflector. In order to strengthen the activity of the heat and radiation energy from a reactor in a boring, the reactor reaction chamber, the reflector space and the treatment space are connected with descending and ascending conduits by which the two systems can be modified by circulation in closed paths.

In a primary circulatory system, suitable media to serve as a moderator, such as water, aqueous solutions or organic liquids are conducted through the descending conduit from the casing head through the reactor reaction chamber and through the ascending conduit again up to the casing head. Near the casing head the two conduits are combined. The heat generated in the reaction chamber will cause the medium to move upwardly in the ascending conduit and by thermosyphonic action it will flow through the descending conduit and through the reactor in closed circulation. During its passage through these conduits it will release its absorbed heat to the surroundings, so that these conduits will function as a heat exchanger. If finely divided fissionable components capable of forming isotopes when subjected to the radiation of the reactor are added to the moderator medium, the radiation from them will not only act upon the moderator but will also act on the surrounding outside. Liquid hydrocarbons can be used as moderator media, in which an aqueous solution of copper sulfate which is not soluble in the hydrocarbon can be dispersed. The atomic nuclei of the copper and sulfur atoms when acted upon by the neutrons produced in the reactor will form short lived isotopes, the radiation of which will act upon the moderator during its circulation and upon the surroundings.

In order to prevent the radiating substances from damaging the reactor with their radiation if they accumulate in too large amounts, a separator is connected to the descending conduit for delivering the separated radioactive materials into the head of the reaction chamber while the descending conduit itself empties the moderator into the bottom of the reaction chamber. This arrangement will prevent the radioactive materials from passing through the reaction chamber of the reactor but will permit them to enter and be acted upon only by the radiation in the head where they will not themselves exert any influence upon the atom splitting process in the reactor.

By means of a secondary system of closed circuit conduits, the reflector liquid, e.g. liquid hydrocarbon, is conducted from the casing head through a descending conduit to the reflector, and from there through an ascending conduit again to the top.

These descending and ascending conduits are connected with each other near the casing head so that closed circulation with thermosyphonic action can be maintained. If heat insulation is applied over the ascending sections of both conduits, then their syphonic action can be increased.

The outer casing of the boring can serve as an ascending conduit, whose large cross sectional area will increase the time of treatment.

For strengthening the thermosyphonic closed circuit circulation, the conduits can be provided with centrifugal pumps whose speed can be controlled to regulate the amount of radiant energy with which the circulating medium is treated. By adding reactants or catalysts to the circulating medium, the system offers further possibilities for the performance of chemical reactions and the formation of desired products.

The reactions can also be controlled by regulation of the temperature. The output of the reactor for example can be controlled by changing the amount of water that is sent through it as a moderator, its temperature being thereby raised or lowered. The boiling point of the water can be controlled by known methods. Its pressure in the reactor can be regulated by causing it to pass through restricted passageways when it leaves the reactor. While in the primary circulation it is possible to exercise some control by regulation of the pressure, it is advantageous in the secondary circulation to control the temperature by the addition of substances which will not act as reaction partners. It is possible for example to produce mixtures with different or constant boiling points, depending on their partial pressures. Mixtures of water and hydrocarbons with selected initial and final boiling points offer the possibility of bringing the temperature in the reactor to a fixed boiling point from anywhere within a larger temperature range.

If the radiation treatment of the liquids in the closed circulatory paths is to be intensified by the presence of radioactive isotopes which were formed during passage of the liquids through the reaction chamber or through the upper portion thereof, then these radioactive isotopes are sent into circulation into the ascending conduit, together with the liquid. For safety purposes, each circulatory system is provided with an inner circulation path containing a separator and an injector for sending the separated isotopes together with some of the circulating fluid from the ascending conduit to the descending conduit below the outer circulation.

A reactor that has been placed in a boring for heat and radiation treatment can be put into operation in different ways. With a production boring the liquids and gases from an underground stratum will enter the boring where they will receive the radiation treatment and will be removed from the casing head. With such an installation a descending conduit is not necessary. If, however, the material is to be put into closed circulation for more intense or specialized treatment, then a descending conduit will have to be provided.

Conversely if a treating medium is to be introduced into the casing head for introduction into the stratum, it will not be necessary for an ascending conduit to be present, provided no closed circulation is required.

If the reactor is in a boring which does not lead to a production stratum, so that the depth of the boring is not determined by the location of the stratum but only by safety considerations, it will be possible to give the boring a larger diameter than would be ordinarily economical for production borings. With increased boring diameters the problem of radiation protection above, in case of accident, becomes of increased importance. Adequate protection of the boring by lining with cement is indispensable. The lining can be applied by using pipes outside the casing for conducting the cement.

If such a boring does not lead to a production stratum, the lower end of the casing for a depth of 3 to 5 meters is strongly embedded in cement so as to form a blind boring. Upon this cement footing a vessel of chemically inert material can be mounted for catching spent reactor fuel in dissolved or solid state. It can for example be located in the center of a production field, surrounded by production borings. The liquid or gaseous products of these borings are conducted from the casing head of the blind boring down through a descending conduit to the reactor, then up through an ascending conduit, and eventually after closed circuit treatment they are again brought to the casing head. The treated and warmed products can eventually be stored underground in natural or artificial chambers. They can also be returned to the strata where these heated and converted products will help to expedite the working of the strata.

The media that have been brought from the strata into the secondary circulation may contain reactor poisons which would unfavorably affect the controlled nuclear chain reaction in the reactor or may even bring it to a stop. In such a case the secondary circulation is not brought through the treatment space between the reaction chamber and the reflector, but instead through the reflector, while a reflection medium, e.g. the moderator liquid of the primary flow system, through the treatment space which because of its limited width permits some of the electronic currents to pass through it and penetrate the space behind it.

If a reactor which is deep underground is to be operated for a long period of time, it will eventually present the problem of how its spent fuel is to be replenished.

It is also suggested that for multiple charging of reactors, solid fuel elements could be used whose form could be such that they would leave much open space between them. Most suitable for that purpose, and especially for the lower portion of the central chamber, would be the spherical form. When the activity diminishes, additional spheres of fresh fuel and of smaller diameter can be introduced into the spaces between the original spheres. This subsequent addition of new spheres not only replenishes the fuel, but also compensates for the poisoning effect of the original spheres which have not yet been completely consumed. If furthermore these spherical elements are coated with an inorganic salt which is not rendered radioactive in the reactor but which strongly expands during increase of temperature, the change of spacing thus produced between adjacent spheres will have a regulating effect upon the output of the reactor.

It has already been suggested by this invention to give the pieces of fissionable material specific shapes, and these may be of such a form that the nuclear reaction will be controlled by the temperature in the reactor.

It is important that the concentration of the pieces of fissionable material in the reactor space, namely the amount of fissionable material per liter of reactor space, should have an optimum value of 75 to 350 g. Of no less importance are the shapes of the pieces which should be such that at the existing concentrations they will have maximum contact with the cooling medium.

It is therefore suggested that the fissionable material be given a coating of two different metals, e.g. aluminum and steel. Bands of such metals 0.30–1.5 mm. thick and 10–20 mm. wide and of various lengths are welded at their edges so as to form a shell into which the fissionable material is introduced in the form of a powder or a ribbon of 0.2–3 mm. thickness.

For a better understanding of the objects, features and advantages of the invention as described particularly and distinctly in the appended claims, reference is now directed to a further and more detailed description of the invention taken in connection with the accompanying drawings wherein:

Figure 6:
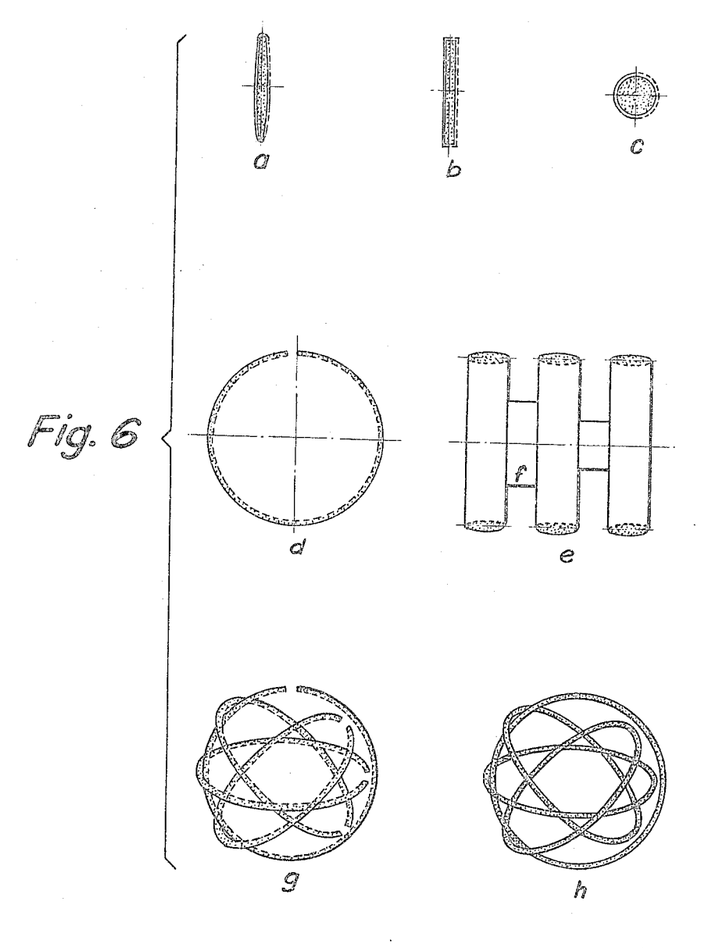
FIGURE 6 shows various geometric shapes of fissionable bodies.

Referring now to the last mentioned figure, the fissionable material itself is represented by a multiplicity of dots. The dotted and solid lines around the dotted regions are supposed to indicate that the covering consists of two different metals. As shown in FIGURE 6, the bimetallic capsules containing the fissionable material can be either oval (6a), rectangular (6b) or circular (6c). Bands or ribbons so constructed are then bent into circular rings of 20–100 mm. diameter (6d) or into elliptical rings, with open ends. The open rings can be piled upon one another to form cylinders (6e) or 20–100 mm. diameters with spacers (6f) between them to keep the rings 5–10 mm. apart from one another. They can also be slipped irregularly over one another like balls of twine (6g).

The fissionable material can also be coated upon the external surfaces of bimetallic ribbons of different metals. The outer forms of such coated ribbons could then be similar to those shown in FIGURES 6a–6g.

Because of their bimetallic construction, these ribbons, or the bodies formed thereof, will change their shapes and hence also their spacings from one another during changes of temperature, which phenomenon can be made use of for controlling the reactor.

According to another form of this invention, the fissionable material can be enclosed in a shell made of only one metal. The ribbons produced in this manner are welded at their ends, bent into round or elliptical form, and slipped over one another as shown in FIGURE 6g.

It is also possible to form the fissionable material itself without any surrounding shell into the shape of a round thread or ribbon which can then be wound upon itself to form bodies similar to those of FIGURES 6g and 6h.

Figure 1:
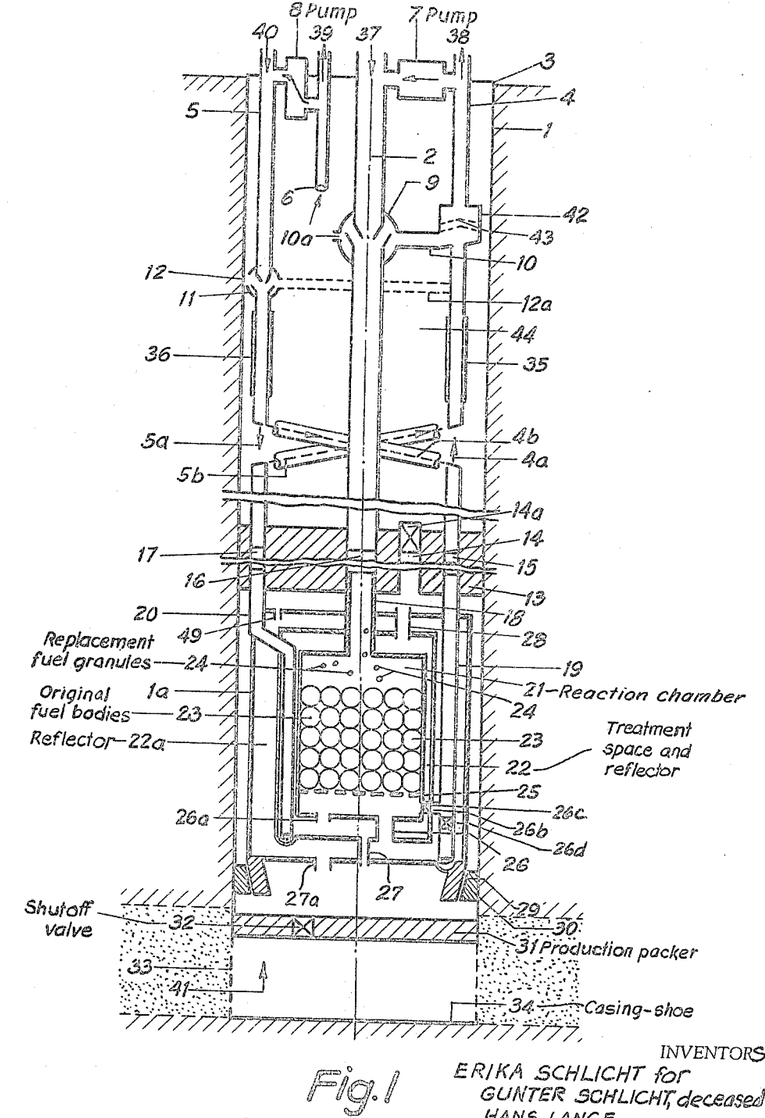
FIGURE 1 is a longitudinal section of apparatus of this invention.

FIGURE 1 shows an apparatus constructed according to this invention. It comprises an outer casing 1, in one section of which the heat and radiation producing reactor is mounted. It is also possible to build the reactor and its accessories in a separate tube 1a whose outer diameter is smaller than the inner diameter of the casing 1. The tube 1a is provided with a conically tapered lower end 29 of the same size as a similarly tapered lower end of the reactor itself in constructions where the reactor is to be mounted directly in the casing 1. The reactor carries in the casing immediately above it a transverse closure partition 13 and the ascending and descending conduits with their accessories which serve as a heat exchanger and radiation producer.

In FIGURE 1 provision has been made for various operating procedures and modifications, and many others could be suggested, but in each of which there would be a primary and a secondary system of circulation paths. In order to indicate such possible variations on the drawing, the corresponding parts of different circulation paths are designated by the same reference numerals but with different suffixes (a, b, c and d). In the casing 1 which has securely fastened in it a conical ring 30, there is positioned a reactor reaction chamber 21 with the reflector 22a and a treatment chamber 22 between the reaction chamber and the reflector, the treatment chamber itself also serving as a reflector. These parts are all supported by the conical foot 29 in the ring 30 by a fluid tight seating.

In the same section of the casing 1, or in the tube 1a, a packer 13 is positioned. This can be a packer of usual construction of the kind used in multiple zone production, and can be set or welded in place. In order that this packer will be sure to maintain a tight seal at temperatures up to 300° C., it may have a length of 3–5 meters. It is in the form of a sufficiently strong integral construction to be able to withstand great forces axially of the borehole without deformation or failure. The conduits 18, 19 and 20 connect the reactor 21 and its chambers 22 and 22a securely with vertical passageways 15, 16 and 17 through the packer. The conduits 18, 19 and 20 and also the passageways 14 are provided with built in flow controllers and valves, e.g. check valves.

The reactor 21 with its packer 13 and the supporting cone 29 can be contained in a casing section about 12 m. long. However, it is also possible to mount the reactor 21 with the packer 13 and its connecting pipes 18, 19 and 20 in a tube 1a whose outer diameter is smaller than the inner diameter of the casing 1, and whose supporting cone 29 remains of the same size. In this case the reactor can thereafter be placed in the previously cemented casing 1 and provided with the necessary equipment. The boring is closed by a fluid-tight cover 3.

A production boring is connected with the deposits in the strata by a perforated casing section or liner 33. The material from the strata will then flow into the lower portion 41 of the boring, which is shut off from below by the shoe 34. Above the liner 33 there is a production packer 31 with a shut-off valve 32. A treatment boring such as detailed at 57 and 60 in FIGURE 4 through which liquids or gases from elsewhere can be introduced into or taken from the production stratum would be similarly constructed in its lower portion as shown in FIGURE 1. A simple flow through the reactor without movement in any closed circuit can be established by closing the valve 14a in the passageway 14. With a blind boring the valve 32 is closed so that liquids which have been introduced into the stratum can again be removed from the casing head.

For explanation of the process, a simple procedure will now be described. Other possibilities, which may be necessitated by disturbances of the chain reactions or of the reflection in the reactor, can be taken care of by suitable combinations of steps suggested by FIGURE 4, or by other steps not listed there.

Figure 4:
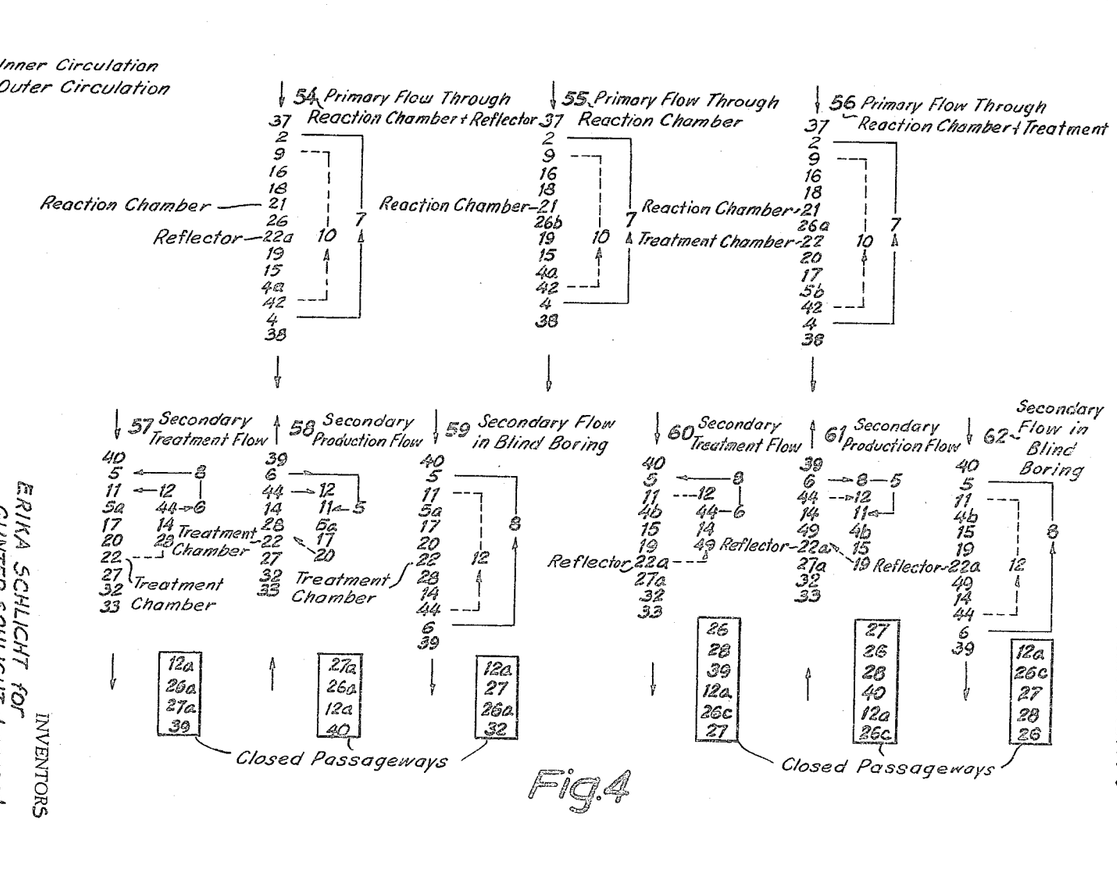
FIGURE 4 is a schematic view of several different possible flow paths of the primary system and the secondary system dependent on the nature of the reflection medium.

The presentation on FIGURE 4 shows the importance of using a treatment space 22 which only in combination with the reflector 22a can be regulated according to the laws that control the chain reactions in a boring with varying and uncontrollable contents.

The simplest method of operating a reactor of a blind boring consists of introducing at 40 into the descending conduits 5 and 5a the secondary fluid consisting e.g. of liquid hydrocarbons free from reactor poisons. The liquids after traversing the passageway 17 and the pipe 20 enter the treatment space 22 as a reflection liquid, and leaves by a passageway 28. The same liquid traverses the reflection space 22a in a direction parallel thereto after passing through openings 27 and 27a, and then through the opening 49 together with the liquid from the treatment space 22 and then through the opened passageway 14 into the free space 44 in the casing 1 in which it will ascend until it leaves through the conduit 6 at 39.

The starting of the reactor by the introduction of the primary fluid which may consist of a moderator composed of a liquid hydrocarbon can be accomplished by introducing the moderator at 37 into the descending conduit 2, from where it will flow through the passageway 16 and the conduit 18 into the reaction chamber 21 for passage between the fuel elements 23 and from there through the open passageway 26c and with the valve 26d closed it will enter the ascending portion of conduit 19, traverse the opening 15 and continue upwardly through conduits 4a and 4 until it reaches the exit port 38, the openings 26 and 26a remaining closed during that time. Hydrocarbons which have been treated in this manner can be removed through outlet ports 38 and 39 if at the same time replacement is made through inlet port 40.

If the radiation treatment is to be intensified, a very concentrated aqueous copper sulfate solution can be added through the inlet port 37 at a uniform rate to the primary liquid. In the reaction chamber the copper and sulfur ions are rendered radioactive and pass upwardly through conduit 4a to the separator 42 with its baffles 43. The particles in the salt solution which are not soluble in the moderator are returned for thermosyphonic circulation from the separator 42 through conduit 10 to the injector 9 to be delivered to the descending conduit 2. While they remain in the primary circulation these radioactive particles give additional radiation treatment to the moderator liquid, but the radiation from them also reaches the secondary stream and imparts to it in the ascending space 44 a long continued radiation treatment while to the liquid in the descending conduit 5a there is simultaneously imparted a short-time radiation treatment.

The secondary flow during its passage through the treatment space 22 and the reflector space 22a receives strong radiation treatment from the reaction chamber 21.

The inner circulation of the primary system can be intensified by the heat insulation 35, while a further intensified inner circulation is established by the pump 7 and by the injector 9, the opening 10a being kept closed during this time.

The secondary system can also be given an intensified inner circulation through the opening 12 and through heat insulation 36 by pump 8 and injector 11, the conduit 12a remaining closed during this time. For the secondary system, the blind boring is closed below by the packer 31 and the valve 32. For production or treatment borings the valve 32 is opened so that the bitumens from the strata can enter the boring through the perforated liner 33, or can pass from the boring through this liner into the stratum.

FIGURE 4 shows the possible flow-paths of the primary system and of the secondary system according to the nature of the reflection medium, depending on whether it contains reactor poisons and whether or not it is effective in reflecting neutrons. The possible flow-paths are indicated by 54, 55 and 56. Paths 54 and 55 are possible if the secondary stream 57, 58 and 59 contains good reflecting material while the primary stream 56 has to be introduced when the secondary stream 60, 61 and 62 contains materials not suitable for the reactor.

The inner circulation of each system is indicated in FIGURE 4 by dotted lines while the passageways which at the time remain closed are enclosed in rectangles.

The outer circulations are indicated by solid lines. The arrows at the beginning and end of each stream indicate the direction of flow of the inner or outer stream through the boring, and also where it leaves the boring, namely, whether the secondary stream is used for treatment as in 57 and 60, for production as in 58 and 61, or in a blind boring as in 59 and 62. If a medium which is unfavorable to the reactor is to be treated in the secondary stream, the paths 5a and 5b and 4a to 4b are used.

The reactor contains solid pieces of fissionable material 23 of definite shapes, e.g. spheres, which are in contact with one another, but have voids between them. These voids can be partly filled by smaller spheres, as when the larger spheres have been consumed and have to be replenished by smaller spheres. Accordingly, the perforations in the floor 25 have been made small enough to retain the smaller spheres. The activity of the reactor can also be prolonged by not completely filling it at the start so that additional spheres of the original size can be added later.

Figures 2, 3:
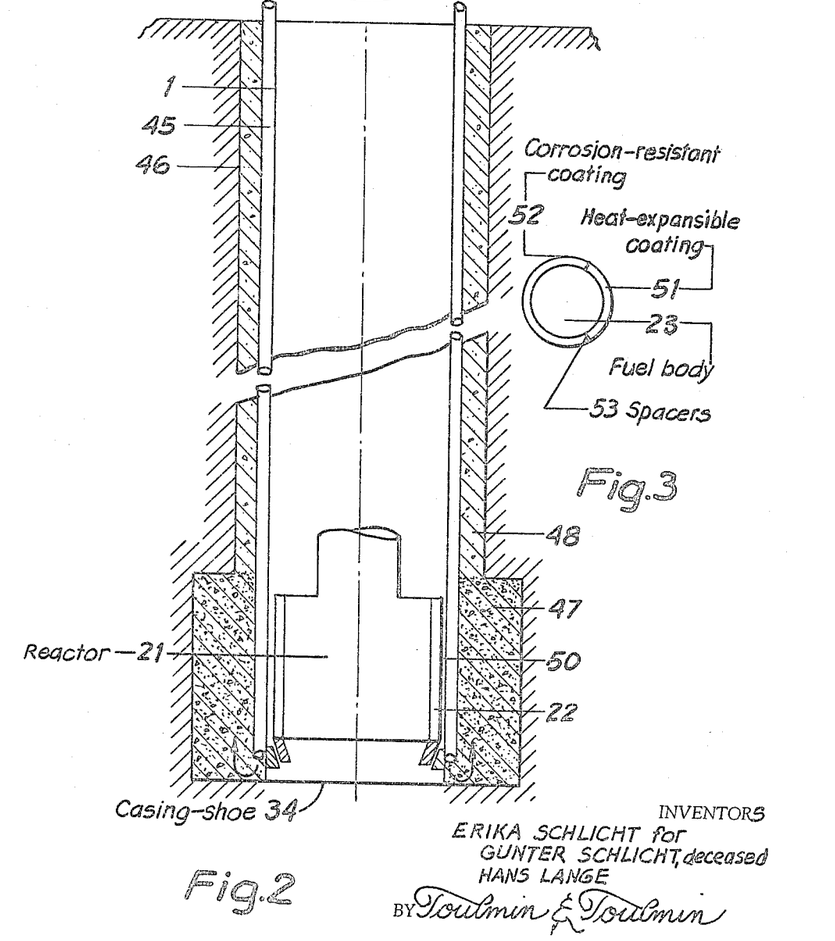
FIGURE 2 is a modification of FIGURE 1 wherein additional wash pipes are arranged outside of the casing.
FIGURE 3 is a sectional view of a novel fuel element of this invention.

An additional improvement is shown in FIGURE 3 where the fuel body 23 is coated with a layer 51 of a material, such as melted salt or metal, e.g. 100% liquid sodium or 50% $NaF+50\%$ $ZrF_4$, which is quite refractive to radiation but has good thermal conductivity and high thermal expansion so that the spacing between the coated bodies increases with increased temperature and the activity of the reactor is thereby diminished. To protect the coating 51 against injury or deformation a protective coating 52 of corrosion-resistant material such as aluminum or high-grade steel with a small capture cross-section can be applied on the outside, while mechanical spacers 53 can also be used.

The moderator/fuel ratio is important, the limits being 996.4 to 350 cm.$^3$ moderator per 3.6 to 18.1 cm.$^3$ fission matter in 1 litre reactor core. With a continual circulation of hydrocarbons as the moderator, a reactor in a boring can be supplied with moderators of different densities within certain limits to control the activity of the moderator.

With the reactor cemented in the boring with maximum tightness, and with the fissionable materials deposited therein, it will be possible for a sufficiently strong vapor formation from the moderator, during its passage between the bodies of fissionable material, to lift the fissionable material for a short time out of their critical positions so as to render the reactor self-throttling. The bodies of fissionable material can be of such shapes and sizes that when the moderator boils with a certain intensity, the bodies will be agitated sufficiently to cause some of them to float. The descending conduit 18 should then open into the lower part of the reactor with the outlet at the top of the reaction chamber. This can be done by transposing the injector 9 and the separator 42 while the conduit 10 remains in the same position so that 38 becomes the inlet and 37 the outlet. The circulation 55 in FIGURE 4 will then occur as follows: 38–4–9–15–19–26b–21–18–16–42–2–37 with 10a, 26, 26a and 26d closed.

The operation of such a reaction chamber with upward flow of moderator will be improved if the reaction chamber is conically enlarged in the upward direction, either throughout its entire height or only in the middle. If the upper portion of the reactor remains cylindrical but of enlarged diameter, the reduced rate of flow therethrough will permit the smallest and most unfavorably formed bodies of fissionable material to collect therein and remain in suspension. With such an apparatus the nuclear reaction can be either interrupted or activated so that the reactor can be either shut down or maintained critical for a long period of time.

The reactor can be replenished with new fuel elements by stopping the primary circulation and introducing the new fuel elements into the opening 37.

The fuel elements that are to be added are of such selected shapes and sizes that upon introduction of the moderator into the reaction chamber from below with reversal of the direction of flow, there will be a stratification of the different kinds of fuel elements in the conical portion of the reactor. In this manner certain kinds of fuel elements can be kept at certain levels for controlling the reactor. For example the outer shape of part of the fuel elements roughened or edged with different surface shapes is brought to a resistance coefficient of over 1.65, while another part has resistance coefficients below this value.

If the velocity of flow is slowly diminished, and the stratification thereby discontinued, the fissionable elements will collect in the lower portion of the reaction chamber and the reactor is brought to the critical condition. If necessary, a liquid of high specific gravity of about at least including drilling additive 1.24 kg./l., but which would be unsuitable for use as a moderator may have to be used, and which would be displaced by the moderator after the required stratification has been completed. Naturally, during normal operation of the reactor, the velocity of flow of the moderator through it will have to be much lower.

Figure 5:
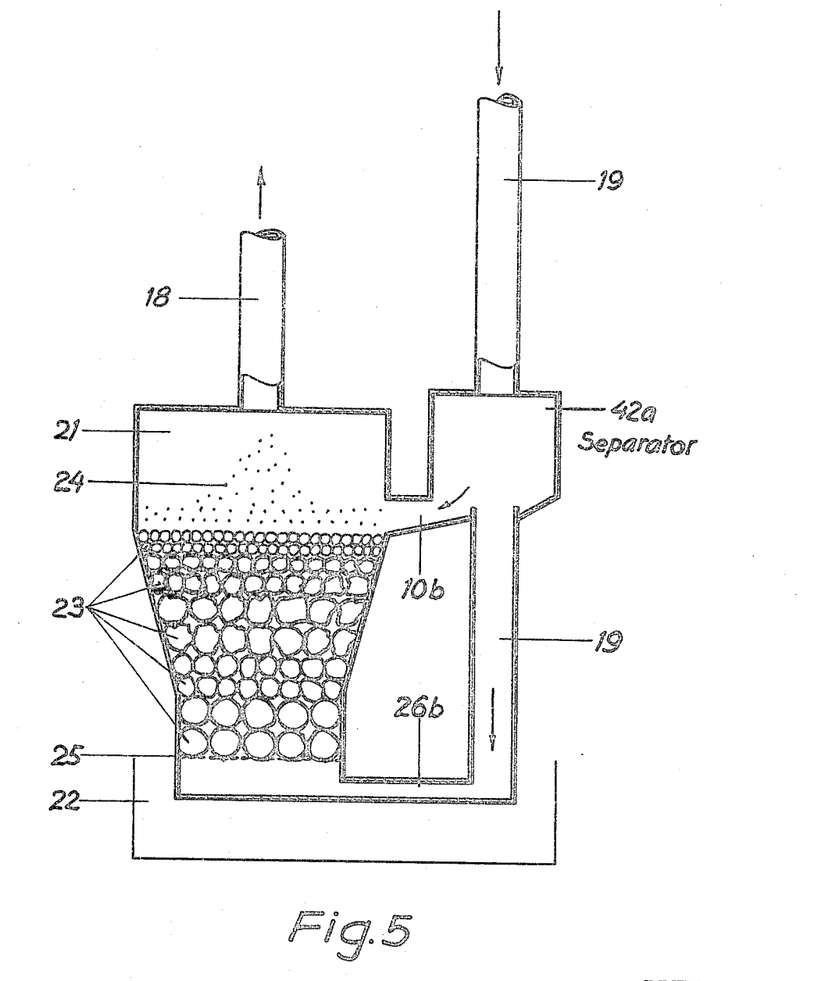
FIGURE 5 is a longitudinal section of a modification of a descending conduit in association with a separator.

In the presence of larger amounts of isotopes or finely divided particles of fissionable materials in the primary circulation there is the danger that these may disturb the progress of the chain reaction or may stop it completely. To prevent such a disturbance, the conduit 19 (FIGURE 5) into which the moderator is introduced, and which is now a descending conduit, has connected in it a separator 42a at the level of the head 21 of the reaction chamber and from which a conduit 10b leads to the upper cylindrical portion of the reaction chamber. The particles of fissionable material which are delivered through this conduit into the head of the reaction chamber are acted upon only by the normal radiation from the middle of the reactor and by the radiation from the particles of fissionable material directly underneath which are held in suspension in the conically enlarged portion of the reaction chamber.

Figure 2A:
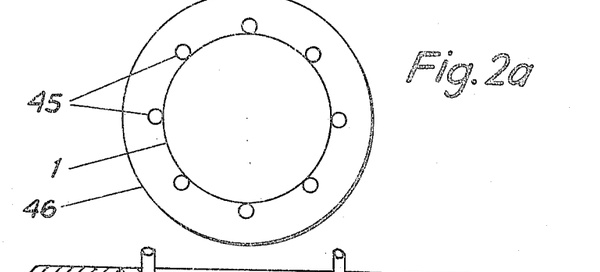
FIGURE 2a is a plan view of the apparatus shown in FIGURE 2.

The diameters of borings lined with casings 1 which are cemented in place throughout heights of several hundred meters to seal them from above, are limited to about 500–500 mm. If, however, additional wash pipes 45 are arranged around the outside of the casing 1 with spacings of 300–600 mm. from one another as shown in FIGURE 2a and with the wall 46 of the boring at a corresponding distance from the casing 1, then such borings with diameters of 4000 mm. and more can be bored several hundred meters deep and also with a strong and radiation proof cement lining 48 throughout their entire height.

Through the wall pipes 45 around the outside of the casing 1a thixotropic liquid with good reflection properties, such as viscous drilling fluid consisting of water, clay capable of swelling and an additive of carboxymethyl cellulose is introduced after the cementation but before the setting of the cement to displace the cement in the enlarged chamber 47 and also over a greater height if there is sufficient spacing between the casing 1 and the wall 46 of the boring.

In this case the reactor 21 which has been seated in the casing 1 will not need to be provided with a reflector but only with a treatment chamber 22. The surrounding space 50 in FIGURE 2 can then be kept very narrow, as low as about 15–20 mm. when using water as reflector, as can be seen on the right side of FIGURE 2. The reactor will then not need to be firmly attached to the casing 1 but can rest upon the casing shoe 34. If, however, the strata around the boring contain substances that would poison the reactor, then as has been shown at the left, the reactor can be provided with a reflection chamber 22a, or the space around it is made so wide that it can be filled with a liquid that functions as a reflector.

The pipe 6 shown in the upper left of FIGURE 1 can serve for the introduction of inert gases under high pressure into the casing for the cushioning of larger pressure waves.

If the consumed fuel material is to be eliminated, it can be disposed of by dissolving it in acid and then washing it out with other liquids. It is also possible, with fissionable bodies of certain shapes, to wash them out through the inlet conduit 37 during reversed circulation by introducing the washing liquid at 38.

A practical but non-limitative example of the process of this invention is the production of antiknock octane and octene from normal butane, or the production of heptenes from isobutene. The conversion of both of these initial substances occurs under various reaction conditions which can be established simultaneously in the primary and in the secondary system of this apparatus by the method of this invention.

The normal butane is introduced into the boring at 37 and passes through the descending conduit 2 as a primary stream, and then through the reaction chamber 21 where the heat and radiation come into action. The end product leaves through conduit 19 and ascending conduit 4, to be discharged through outlet port 38. For a more complete conversion the product is returned by conduit 10 to the descending conduit 2 in an inner circulation which is maintained by thermosyphoning. To effect a further radiation treatment, here as well as in the entire circulation, an aqueous copper surfate solution is mixed with the circulating fluid for conversion of the copper and the sulfur atoms into radioactive isotopes which will be held back by the baffles 43 in the separator 42 in the ascending conduit 4, to be returned through conduit 10 to the primary circulation. Here these radioactive isotopes will spend their radiant energy not only on the normal butane of the primary circulation but also on the isobutane flowing along parallel paths in the secondary circulation.

The isobutane enters the boring at 40. It arrives as a secondary stream through the descending conduit 5 and through conduit 20 into the treatment chamber 22 and reflector 22a. Here it will be exposed to the heat and radiation from the reaction chamber 21. It will then leave through the outlets 49 and 14 to enter the ascending space 44, which it will leave through 6 and 39. In addition to its radiation treatment in the reflector and in the treatment space, the isobutane will also receive radiation treatment while in the descending conduit 5 and while in the ascending space 44 from the conduits 4 and 2 of the primary circulation.

The following numerical values are for 1 liter of fissioning space in the reactor, so that the numbers can be easily converted for smaller or larger reactors.

In a boring that is 650 meters deep, 550 meters will be available as treatment space, the space above being cemented off for safety. In the lower part of the boring is placed an atomic reactor with a yield of 20,000 kcal./hour, about 10% of the radiant energy of which is available for use. It is operated as an organically moderated reactor, whose radiant energy is intensified by the use of radio-active isotopes in the primary circulation.

As a moderator liquid, normal butane is circulated through the reaction chamber while isobutane is circulated through the reflector and through the treatment space. The free space that is available is the reaction chamber, and which is available for the moderator, amounts to 875 cm.$^3$ per liter of fissioning space. There are also 1200 cm.$^3$ of space in the head and in the foot of the fissioning zone which is filled with normal butane that is exposed to the intense radiation from the reaction chamber. The treatment space is of sufficient size to take 800 cm.$^3$ isobutane per liter of fissioning space and the additional space at the head and at the foot amounts to another 800 cm.$^3$. The space in the reflector is filled with 1500 cm.$^3$ isobutane. The normal butane flows through the reaction chamber at the rate of 40 cm.$^3$/sec. per liter of fissioning space.

The isobutane flows through the treatment space and the reflector at the rate of 30 cm.$^3$/sec. per liter of fissioning space. The transverse cross-sections of the descending and ascending conduits of the primary system have inside areas of 2 cm.$^2$ per liter of fissioning space. In the secondary system the inside cross sectional area of the descending conduit is 1.5 cm.$^2$ while the inner transverse cross section of the free space in the casing which serves as an ascending conduit has an area of 8 cm.$^2$ per liter of fissioning space.

The liquid in the primary system is mixed with aqueous copper sulfate solution in the ratio of 3 grams copper sulfate per liter of normal butane, with which the copper sulfate flows in the inner circulation. While in the reaction chamber the copper sulfate will produce radioactive isotopes whose radiation will act upon the entire inner circulations of both the primary and secondary systems. In the following table are given the periods of time during which the liquids remain in the treatment regions, from which the radiant energy absorbed per hour can be calculated.

| | Space in cm.³ | Time of exposure in seconds | Absorbed radiant energy in percent of the reactor energy |
|---|---|---|---|
| Primary System: | | | |
| Ascending and Descending conduits | 220,000 | 5,000 | 2.1 |
| Reaction chamber | 875 | 22 | 4.4 |
| Space in the head and foot of the fissioning zone | 1,200 | 30 | 1.2 |
| Secondary System: | | | |
| Treatment space | 800 | 26.7 | 2.2 |
| Space in the head and foot of the treatment space | 800 | 26.7 | 0.75 |
| Reflector space | 1,500 | 50 | 0.6 |
| Ascending and Descending conduits | 475,000 | 15,800 | 0.65 |
| | | | 11.9 |

The average amount of radiant energy per hourly flow of liquid is therefore $28000 \times 0.119 = 3.33 \times 10^3$ Cal./hour. With this radiation production of 3.33 kcal./hour, a volume of 252,000 cm.³ normal- and iso-butane will correspond to a radiation energy of $3.45 \times 10^{14}$ mev./cm.³

For calculating the converted molecules per cc. of butane, it will be assumed that on the average six circulations are made by the medium under treatment, and that the G-number (=number of converted molecules per 100 ev.) is 12.8. The latter value has been calculated as an average value for reactions under 34 atm. and at a temperature of 245° C. with known catalysts.

The heat is produced by a reactor with about 25,000 Cal./hour per liter of fissioning space. The pressure is the hydrostatic pressure of the butane columns in the boring. After the treatment there is a subsequent transformation which has not yet been explained, and which has therefore not been taken into consideration in the calculations. From the absorbed energy, an average of $3.45 \times 10^{18} \times 12.8 \times 6 = 2.65 \times 10^{20}$ molecules are converted per cm.³ of normal and isobutane.

Nuclear reactors inserted into a well from the surface and firmly connected to the surrounding rock at an adequate depth must have at least two independent safety devices which are to regulate the controlled nuclear reactions, but which need not be operated from the surface, and one of which at least can be removed from the reactor and replaced after the latter is shut down. Five safety factors should be taken into account for an underground reactor:

(1) Safety against the escape of radioactive matter together with normal process products. Double automatic rapid-lock devices will be sufficient which have been installed in the discharge pipe at least 3 m. below surface and which will seal the full cross-section of the well. They will be operated in the well by Geiger counters.

(2) Safety in case of a major accident. No radioactive matter must reach the surface. As an adequate safety zone, installation of the reactor at a depth of 20 m. will be sufficient, if the reactor reaction chamber has an inside diameter of under 500 mm. In case the reactor reaction chamber has an inside diameter of over 1000 mm., installation at a depth of at least 50 m. is necessary. The well casing will be cemented from the surface by pressure cementing down to 5 m. above the reactor. The remaining 5 m. down to the bottom of the reactor will remain filled with a very viscous drilling fluid between the side of the hole and the reactor. The drilling fluid will pass on to the surrounding rock any percussions of the reactor.

As a further safety measure an iron plug with check valves in the openings will be inserted, 5 to 10 m. above the reactor, in the casing with which and in which the reactor has been installed, and will be firmly connected with the casing. At the level of the plug the casing will be firmly connected with the rock by cementing.

The plug will have 5 times the length of its diameter for a reaction chamber diameter up to 500 mm., for larger sizes the length of the plug will be 4 to 3 times that of its diameter.

(3) Safety against contamination of water veins. The depth at which the reactor is installed should be below fresh water layers. If water veins occur at too great depth, then a further outer protective casing must be set down to 5 m. below the reactor and must be firmly cemented to the rock in its entire length. Between this outer casing and the casing containing the reactor an annulus is formed which will be closed with a highly thixotrope drilling fluid and a cement bridge.

(4) Safety zone for used fuel elements. Used fuel elements will be lodged in a fading container within the well. Its diameter will be so computed that no critical matter can result. For reasons of safety, the depth at which the fading container will be installed should be at least 10 m. below the surface measured from the top of the container.

(5) Persons working at the reactor or in its neighborhood will be 20 m. from the reactor, at least.

For the performance of the process a well will be drilled for instance to a depth of 85 m. using a 425 mm. drilling bit. The reactor will be inserted into the uncased hole in a casing string of 150 mm. inside diameter, installed at a depth of 85 m. and firmly connected with the side of the hole by pressure cementing in the area of the well from 0 to 78 m. depth. The lowermost 7 m. of the hole will remain filled with the very viscous drilling fluid. The reactor has a reaction chamber with an inside diameter of 300 mm. It will be charged with fuel elements consisting of 90% enriched uranium 235. These fuel elements consist of fuel strips bent into ball shape which as built-up bodies have an outside diameter of 25 mm. They will have jackets consisting of bimetal. These jackets of the fuel strips of approx. 1.5 mm. thickness consist on one side of high-grade steel plate of 0.5 mm. thickness and on the other side of aluminium plate of 0.5 mm. thickness. This causes a 10% difference in thermal expansion whereby, through a change of temperature of 85° C., the shape of the fuel elements changes bodily by 5%. Thus, the critical matter of the fuel elements in the reactor chamber is not increased but reduced whereby a self-regulating effect is reached. The reflector surrounding the reaction chamber will have an additional processing chamber of 20 mm. width, since matter will be processed which is not particularly well suited as moderator. Having passed through the processing chamber the matter will flow through the outer reflector chamber which has a width of 15 mm.

In order to prevent an escape of radioactive matter from the well in case of a reactor accident, an iron plug, similar to a production packer, will be installed in the casing at a depth of 76 m., i.e. in the cemented area. It will have 2 to 4 openings for smaller pipes of an inside diameter of approx. 35 mm. The 150 mm. plug will be 5 times as long as its diameter, i.e. 750 mm., so that in its interior removable check valves can be installed via the 35 mm. pipes leading through the plug. At the level of this plug, at 76 m., a firm bridge to the rock wall is planned as a safety measure. When the check valves are removed, the used fuel elements can be washed out through the pipes leading through the plug and new fuel elements can be inserted in the same manner.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalents of the following claims.

What is claimed is:

1. An apparatus for underground heat and radiation treatment of bitumens, said apparatus having a primary flow system for a liquid containing no reactor poisons and a secondary flow system for liquid bitumens injurious to a reactor, said apparatus comprising:
   (a) an elongated outer casing extending underground in a boring;
   (b) an atomic reaction chamber disposed in the lower end of said casing, said reaction chamber having nuclear fuel therein;
   (c) a treatment chamber disposed around said atomic reaction chamber;
   (d) a reflecting chamber disposed around said treatment chamber;
   (e) means for conducting ascending and descending liquids connecting the head of the casing with said atomic reaction chamber, said treatment chamber and said reflecting chamber; and
   (f) means for passing the liquid of one of said flow system through two of said chambers and the liquid of the other of said flow systems through the other of said chambers whereby primary flow systems are defined by said liquid having no reactor poisons flowing through said reaction chamber, through said reaction chamber and said treatment chamber or through said reaction chamber and said reflecting chamber and secondary flow systems are defined by said liquid bitumens flowing through said treatment chamber, though said reflecting chamber or through said treatment chamber and said reflecting chamber.

2. The apparatus of claim 1 wherein said elongated outer casing is perforated in its lower vertical walls.

3. The apparatus of claim 1 further comprising a production packer in the lower end of said casing.

4. The apparatus of claim 1 wherein said reaction chamber contains preformed nuclear fissionable bodies embodying said nuclear fuel.

5. The apparatus of claim 4 wherein said preformed nuclear fissionable bodies are spherical.

6. The apparatus of claim 4 wherein said preformed nuclear fissionable bodies are coated with heat expansible material, whereby a change in temperature will alter the spacing between the bodies, thereby affecting the activity of said atomic reaction chamber.

7. The apparatus of claim 4 wherein the preformed nuclear fissionable bodies are disposed in a sheath of two different metals with different coefficients of expansion, the bodies being heat-expansible arcuate cut-off pieces.

8. The apparatus of claim 4 wherein the preformed nuclear fissionable bodies comprise a plurality of superimposed rings, and intermediate spacers separating said rings, thereby forming a cylindrically shaped body.

9. The apparatus of claim 4 wherein the nuclear fissionable bodies are comprised of a plurality of rings of fissionable material arranged to form a spherical shape.

10. The apparatus of claim 4 wherein the nuclear fissionable bodies comprise a plurality of ring of fissionable material arranged to produce an oval cross-section.

11. The apparatus of claim 4 wherein said nuclear fissionable bodies comprise fissionable material disposed in a shell of a single metal formed in a closed ring-like shape.

12. The apparatus of claim 11, further comprising a plurality of said ring-like shapes arranged in the form of a cylinder.

13. The apparatus of claim 11, further comprising a plurality of said ring-like shapes arranged in the form of a sphere.

14. The apparatus of claim 1 further comprising a separate tube disposed concentrically inside said casing, said separate tube having an outer diameter smaller than the inner diameter of the casing, said tube further comprising a conically tapered portion at the lower end thereof disposed below said reactor and a packer in the upper end of said tube for affixing said tube in the casing.

15. The apparatus of claim 1, further comprising said treatment chamber positioned in said casing in such a manner that intermediate surrounding space is of sufficient width to enable it to serve as a reflector.

16. In combination with the apparatus of claim 1, stratum pumps and injectors between said means for conducting ascending and descending liquids for keeping the media in circulation for repeated treatment.

17. The apparatus of claim 1, wherein said reaction chamber comprises in combination a downwardly tapered conical reaction chamber containing fissionable elements of different forms and sizes, an admission conduit at the bottom of the reaction chamber for introducing a moderator medium, an outlet conduit at the head of the reaction chamber so that on the one hand the fissionable elements in the reaction chamber are classified and kept partly in suspension by the medium that enters at the bottom of the chamber, and on the other hand the velocity of flow, which is dependent on the heat production in the reaction chamber, regulates of its own accord the spacing of the fissionable elements and thereby the fissioning reaction.

18. The apparatus of claim 17, comprising in combination a separator at the top of the reactor in the moderator admission conduit, in which separator the small particles of fissionable material which are circulated in the conduits of the primary flow path are separated and delivered through a connecting conduit to the head of the reaction zone.

19. The apparatus of claim 1, further comprising a plurality of wash pipes arranged around the periphery of said casing throughout the entire length thereof, said wash pipes defining means for passing liquid cement into the intermediate space between said casing and the boring around said casing, and said wash pipes also defining means for passing a thixotropic liquid and displacing said liquid cement on the outside of the casing from the foot of the boring to above the head of the reactor in the casing.

20. The apparatus of claim 1, wherein said reaction chamber of (b) is underground at least about 20 meters.

21. A process for the continuous thermal and radioactive treatment of liquid bitumens in an underground atomic reactor having a reaction chamber, a treatment chamber disposed around said reaction chamber, a reflecting chamber disposed around said treatment chamber means for interconnecting said reaction chamber with said reflecting chamber, means for interconnecting said reaction chamber with said treatment chamber, and means for interconnecting said treatment chamber with said reflecting chamber, said process comprising:
   (a) passing a liquid having no reactor poisons as a moderator through said reaction chamber or in series through said reaction chamber and one of the other chambers defining a primary flow system; and
   (b) passing liquid bitumens injurious to a reactor through said treatment chamber, said refiecing chamber or in series through said treatment and reflecting chambers defining a secondary flow system wherein said primary flow system always passes through said reaction chamber and said secondary flow system never passes through said reaction chamber.

22. The process of claim 21 wherein said liquid contains granular particles of fissionable material, and further comprising the step of separating said fissionable material from said liquid in a separator positioned above the reactor, and diverting said material to the head of said reaction chamber for closed path circulation, but without passage of said particles through the reaction chamber in the path of the primary circulation.

23. The process of claim 21, wherein said liquid and said liquid bitumens are circulated in closed paths.

References Cited

UNITED STATES PATENTS

| | | | |
|---|---|---|---|
| 2,207,759 | 7/1940 | Reimers | 166—29 |
| 3,054,738 | 9/1962 | Hermans et al. | 176—46 X |
| 3,080,918 | 3/1963 | Natland | 166—39 |
| 3,089,834 | 5/1963 | Madsen | 176—30 |
| 3,110,346 | 11/1963 | Spurlock et al. | 166—21 |
| 3,126,322 | 3/1964 | Suttle et al. | 176—39 X |
| 3,129,140 | 4/1964 | Stohr et al. | 176—90 X |
| 3,152,964 | 10/1964 | Avrameto et al. | 176—90 X |
| 3,164,207 | 1/1965 | Thessen et al. | 176—39 X |
| 3,166,614 | 7/1965 | Taylor | 176—90 X |

OTHER REFERENCES

Carlbom et al., U.N. Int. Conference on the Peaceful Uses of At. Energy, vol. 11, p. 101–106, year 1958.

REUBEN EPSTEIN, *Primary Examiner.*